(12) United States Patent
Lin (10) Patent No.: US 9,916,413 B2
(45) Date of Patent: Mar. 13, 2018

(54) TRANSISTOR PLASMA CHARGING METAL DESIGN RULE GENERATOR

(71) Applicant: Wallace W. Lin, San Jose, CA (US)

(72) Inventor: Wallace W. Lin, San Jose, CA (US)

( * ) Notice: Subject to any disclaimer, the term of this patent is extended or adjusted under 35 U.S.C. 154(b) by 70 days.

(21) Appl. No.: 14/856,580

(22) Filed: Sep. 17, 2015

(65) Prior Publication Data

US 2016/0180011 A1 Jun. 23, 2016

Related U.S. Application Data

(60) Provisional application No. 62/124,475, filed on Dec. 22, 2014.

(51) Int. Cl.
*G06F 17/50* (2006.01)

(52) U.S. Cl.
CPC ...... *G06F 17/5081* (2013.01); *G06F 2217/02* (2013.01); *G06F 2217/12* (2013.01); *Y02P 90/265* (2015.11)

(58) Field of Classification Search
CPC ............. G06F 17/5081; G06F 17/5036; G06F 17/5063; G06F 2217/02; G06F 2217/12; Y02P 90/265
See application file for complete search history.

(56) References Cited

U.S. PATENT DOCUMENTS

2011/0215393 A1* 9/2011 Yang ................ H01L 22/32
257/316
2015/0318273 A1* 11/2015 Lue .................. H01L 27/0629
257/296

* cited by examiner

*Primary Examiner* — Vuthe Siek (57) ABSTRACT

A computer-implemented method capable of preparing a design rule indicative of a terminal metal area size of a transistor, minimizing a plasma-induced charging effect to the transistor in a plasma-based process for a dielectric layer performed on a metal layer above the transistor, is provided. The method includes a non-transitory computer readable medium, a design rule generator engine possessing a capability of accurately and swiftly simulating, evaluating and delivering design solutions for interconnect metals and dielectrics while largely saving test chip layout space, and performing the design-for-manufacturing process based on minimized plasma-induced charging effect to the transistor of the integrated circuit design. The disclosed method is applicable to all metal layers in the plasma-based process.

18 Claims, 9 Drawing Sheets

TRANSISTOR PLASMA CHARGING METAL DESIGN RULE GENERATOR

CROSS-REFERENCE TO RELATED APPLICATION

This application claims the benefit of U.S. Provisional Application No. 62/124,475, filed on Dec. 22, 2014.

BACKGROUND

1. Technical Field

The present disclosure represents a computer aided design (CAD) tool that is capable of generating plasma charging metal design rules for MOS transistors of integrated circuits (IC) in a plasma-based manufacturing process. The generated plasma charging metal design rules are used by circuit designers in chip design to protect the transistors from damages incurred during the manufacturing process.

2. Description of Related Art

Plasma process induced charging damages in gate oxide of transistors has long been a reliability concern in semiconductor industry. Such damage sometimes can cause failure in an entire product line during manufacturing process, incurring significant operating loss for business. The plasma charging phenomena are rather complicated because of involvement of many factors. For example, although the conditions of the plasma sources can obviously inflict the damage to transistor gate oxides, the process parameters and the internal and external physical features of the transistor itself can cause gate oxide damages as well in some cases even during a normal operating condition of a plasma source.

As the feature size or the transistors continue to scale down, the huge network of the interconnect metals that connect billions of the transistors in integrated circuit (IC) chips nowadays can inevitably absorb a large amount of plasma-induced charges during one patterning process for the interconnect metal. As a result, improper design of the interconnect layout can potentially introduce excessive charges into the transistors in some regions of the IC chips, incurring damage on the transistors and failing the entire chip product.

Therefore in the modern-day IC chip design, design-manufacturing interaction induced chip failure such as the above plasma charging-related interconnect failure in products are challenges facing the designers. The above plasma-interconnect interaction induced manufacturing yield problem may be tackled by the approach of process recipe adjustment. However, the room for such solution may be limited particularly when a corresponding process technology has been beyond its development stage and moved into production where process recipes mostly remain unchanged and a large scale of process adjustment could be quite costly in term of time and operation budget. Thus, adjustment to the chip design appears to be a better solution to be considered. Design for manufacturing (DFM) has become the mainstream in solving such manufacturing issue. Thus, accuracy of the plasma-charging related backend metal design rules is critical to ensure a sound charging-free or minimized interconnect metal layout design and improve the whole yield the end products.

Preparing the backend plasma charging design rules has largely relied on test-structure approach in which transistor test structures are designed and fabricated on wafers and experiments with measurements are consequently carried out to extract the safe criteria of the backend metal design in order to shield the transistors from the plasma process induced charging damage. Such effort is not only time consuming (in months as usual) but also inefficient as the number of the test structures need to be designed into the test-chip wafers is limited. By using a physics-driven model-based design rule methodology approach, this disclosed transistor plasma charging metal design rule generator is not subject to the above problems and able to generate the plasma charging design rules in a more swift fashion (e.g., within a day).

SUMMARY

The present disclosure represents a change to the conventional methodology of generating back-end charging-free metal design rules associated with the plasma manufacturing process. The present disclosure is based on a physics-driven and model-based methodology. It is capable of, in hours for a given backend IC design, accurately simulating, evaluating and delivering design solutions for the interconnect metals and dielectrics and the frontend transistors undergoing the backend IC manufacturing process. Instead of spending months to achieve the above-mentioned purpose, the disclosed design rule generator is able to generate backend plasma process related metal design rules within a day, dramatically cutting down the time for technology development and product design and therefore saving enormous amount of cost and manpower for IC manufacturing companies.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DESCRIPTION OF THE EXEMPLARY EMBODIMENTS

The aforementioned and other technical contents, features, and efficacies will be shown in the following detail descriptions of a preferred embodiment corresponding with the reference figures.

Figure 1:
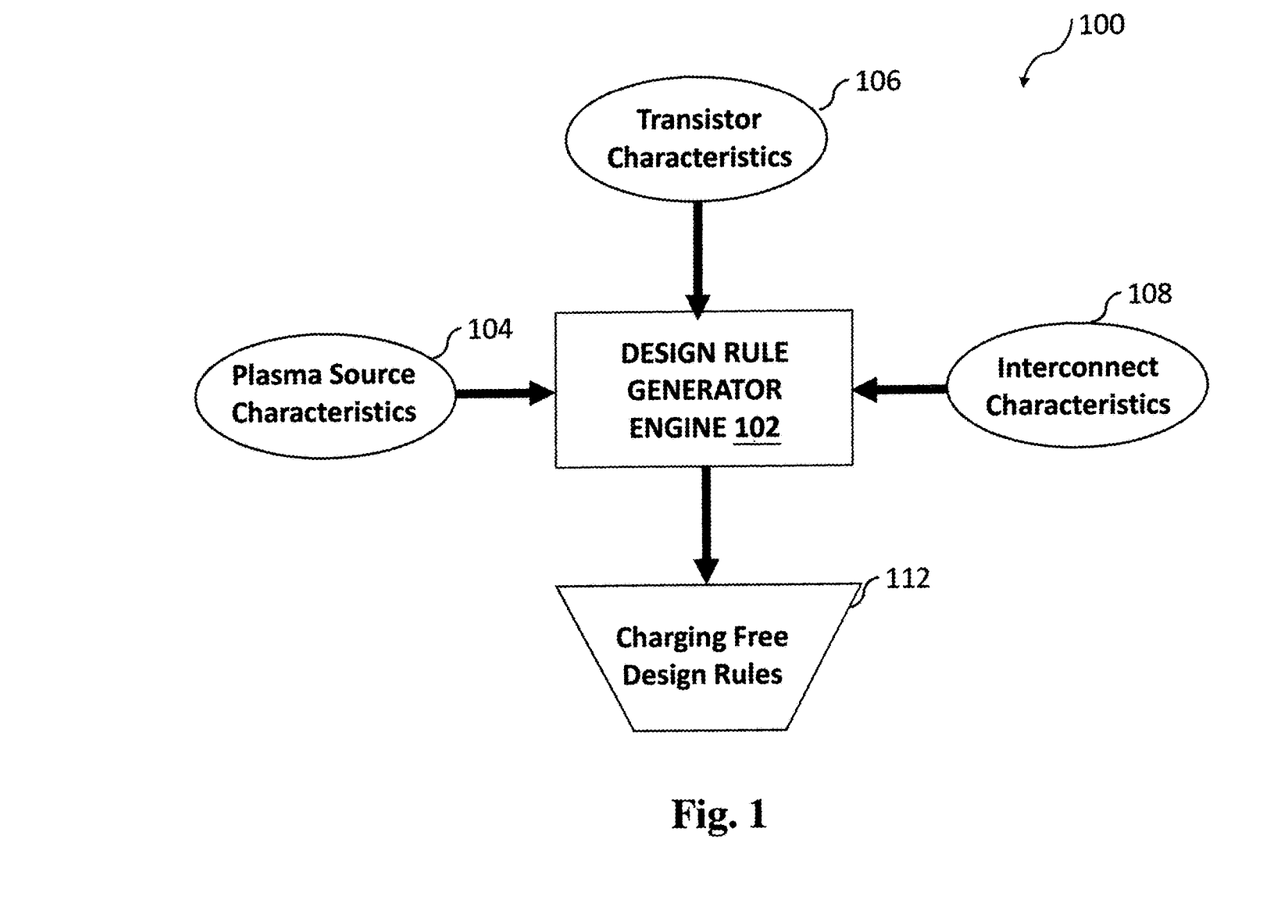
FIG. 1 shows a simplified block diagram of one transistor plasma charging metal design rule generator (PCMDRG) according to one embodiment of the present disclosure.

FIG. 1 shows a simplified block diagram of one transistor plasma charging metal design rule generator (PCMDRG) 100 according to one embodiment of the present disclosure. The PCMDRG may include a design rule generator engine 102. The design rule generator engine 102 may receive at least three groups of inputs: (i) characteristics of a plasma source 104 that includes the polarity of a plasma source, plasma loading characteristics as a function of the plasma power, plasma illumination intensity, etc.; (ii) characteristics of the transistor 106, which includes the transistor type, the transistor internal and external physical features, the transistor leakage related parameters associated with its internal features, the transistor external connectivity and associated parameters, the transistor gate oxide thickness, its leakage behavior and degradation threshold, connection of a protection device at the transistor gate or not, etc.; and (iii) characteristics of interconnects (or interconnectivity) 108 including the number of interconnect metal layers, the thickness and property of each of the inter-metal-layer dielectrics (ILD) layers. Note that the three inputs to the design rule generator engine 102 generally may be parameters associated with the given IC manufacturing process and transistor technology. With at least the above-mentioned three inputs, the design rule generator engine 102 may prepare design rules on basis of which charging damage/effect of a plasma-based/induced manufacturing process could be minimized or even eliminated.

The design rule generator engine 102 of the present disclosure may be implemented based on the follows.

Figure 2A:
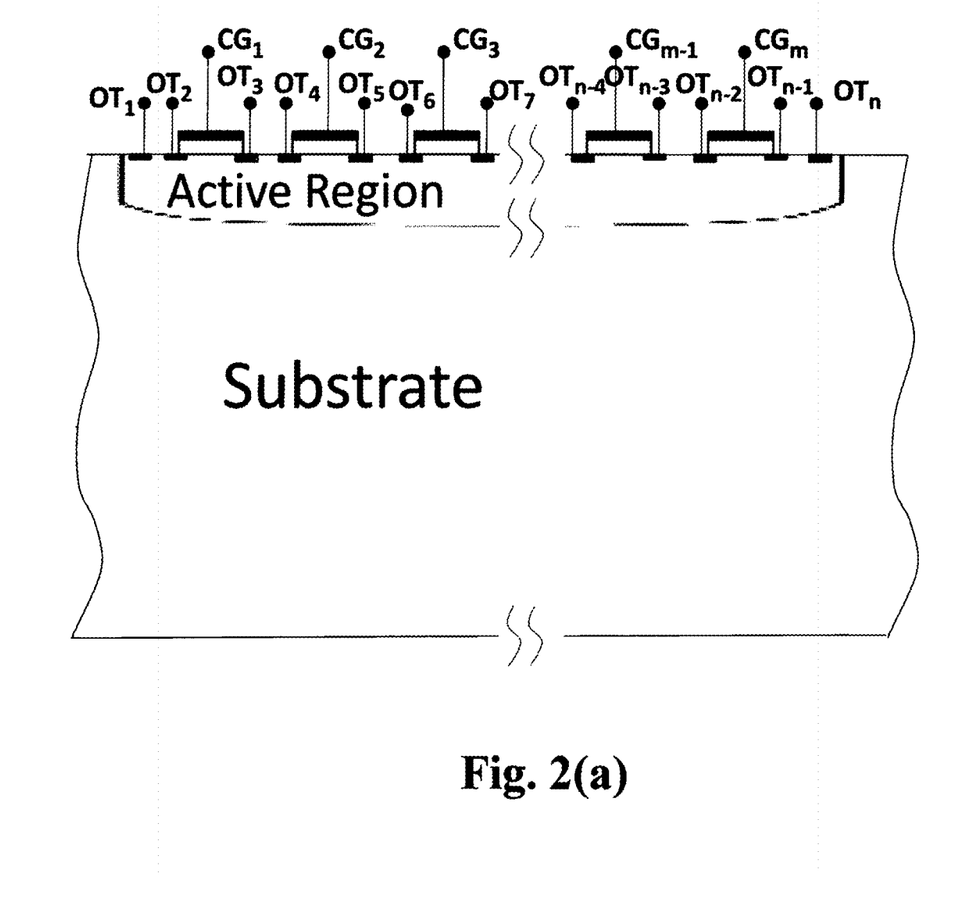
FIG. 2(a) shows a cross-sectional view of a generalized I-terminal insulator-gate field effect transistor according to one embodiment of the present disclosure.
Figure 2B:
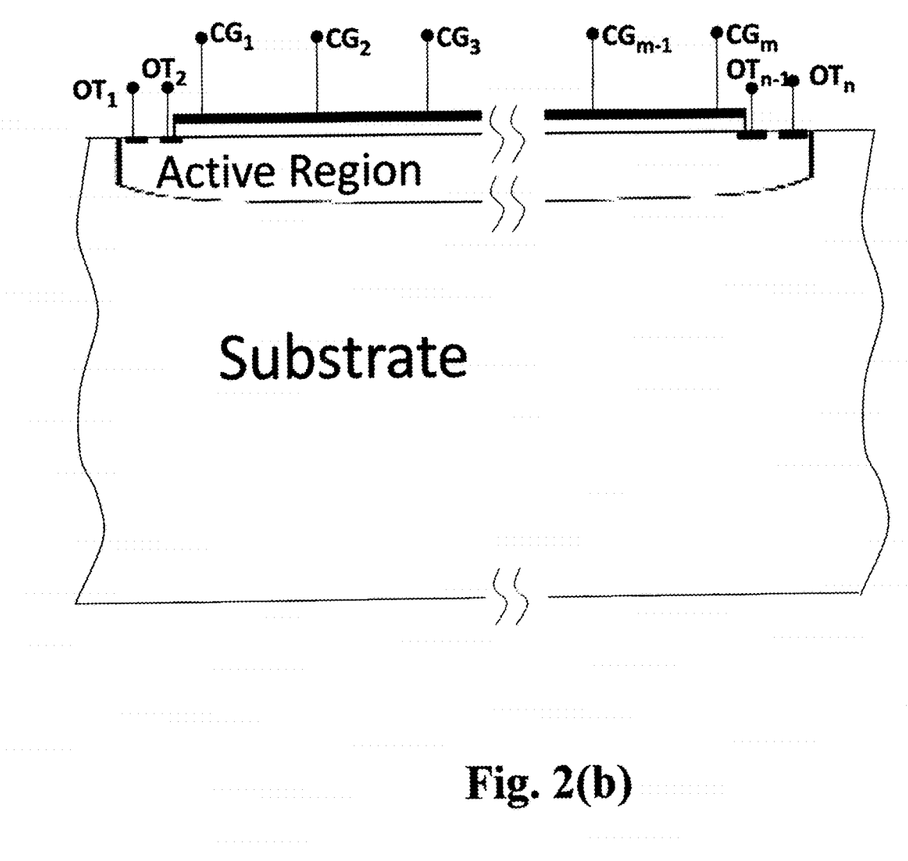
FIG. 2(b) shows a cross-sectional view of another generalized I-terminal insulator-gate field effect transistor according to one embodiment of the present disclosure.

First, we begin with a generalized I-terminal insulator-gate field effect transistor with multiple control gates (CG) on a top side of the insulator and the remaining terminals on a bottom side. If there are m control gates and n other terminals (OT) associated with the active region(s) of the transistor on the bottom side of the transistor insulator, I=m+n. FIGS. 2(a) and (b) shows cross-sectional views of two embodiments of this generalized I-terminal insulator-gate field effect transistor according to one embodiment of the present disclosure. The control gates include but are not limited to conductors or resistors. Connecting the OT terminals to the active region of the transistor may include all forms of junctions, mechanisms and materials enabling the insulator-gate field effect transistor to function properly. The disclosed PCMDRG is suitable for all forms of insulator-gate field effect transistors.

Concerning the plasma charging effect by the metals connected to the m+n terminals of an insulator-gate field effect transistor, the charging-free design in terms of the damage to the insulator of the transistor can be expressed as:

$$|V_{ij}| < V_{ox\_thr}, \quad i=1,2,\ldots,m \text{ and } j=m+1, m+2,\ldots,m+n \quad (1)$$

where $V_{ij} = V_i - V_j$, $$V_i = V_i(F_1, F_2, \ldots F_{m+n}) \quad (2)$$

$$V_j = V_j(F_1, F_2, \ldots F_{m+n}) \quad (3)$$

Vi and Vj are the plasma induced potential at the ith and jth terminals of the transistor, respectively. F1, F2, and Fm+n are plasma-charging-effect functions at the transistor terminals. The function at each terminal may be associated with sources contributing the plasma charging effect to that particular terminal. The sources contributing the plasma charging effect to this particular terminal may also contribute the plasma charging effect to other terminals. Consequently, potential buildup at each of the transistor terminals may be inter-related to potential buildup at all other terminals. The sources of the plasma charging effect may include, but not limited to, internal and external physical structure of the transistor, the process conditions or recipes for the manufacturing of the transistors and the transistor's surroundings including but not limited to the interconnect metals and dielectrics in circuit and layout design of the IC chips consisting of the transistors. Note that the area and periphery of the interconnect metals, the topology pattern of the interconnect metals and the material property of the interconnect metals may serve as the plasma-charging-effect source associated with the transistor's surroundings.

Vox_thr is degradation threshold for the transistor insulator under the plasma charging effect.

Therefore, a charging-free design rule is a set of plasma-charging-effect functions of (F1, F2, and Fm+n) that satisfy the condition of |Vij|<Vox_thr. The resulting design rule may typically form an allowed metal-area curvature surface of the m+n−1 dimension function which satisfies |Vij|<Vox_thr.

In general practice, two types of plasma charging related interconnect metal design rules are used in the industry nowadays. They are classified as protected and non-protected (by a charging protection device) metal design rules, both of which are different from each other by the existence of the charging protection device at the transistor control gate. The protected one may be associated with more relaxed rules than the non-protected. Due to layout space limitation in circuit design, the majority of the transistors in circuits are not attached with the charging protection device. They need to rely on metal design to protect the charging effect. For those transistors which inevitably see large charging effect, the charging protection device may become necessary. Therefore, the two groups of the transistors require two different sets of the metal design rules in circuit design for non-protected and protected cases.

Since the plasma charging effect would be different during each of the interconnect metal patterning steps where the relative position of the in-processing metal and ILD layers from the wafer substrate could be different, the plasma charging related design rules are required accordingly for each of these metal patterning steps. As a result, an eight metal-layer chip manufacturing process will require eight metal charging design rules for each of the transistor type and protection type. For the chips to be manufactured by this eight metal-layer process, a total of 32 (=8×2×2) design rules for both N-type and P-type transistors in both protected and non-protected cases are required.

The above generalized theory can be reduced to a simpler insulator-gate FET case used in modern-day CMOS technology and process. In such case, the charging-free design rule for a 4-terminal P MOSFET having one control gate and one source, drain and N-Well (NW) terminals would be that the plasma-charging-effect functions of (F1, F2, F3, and F4) satisfy the condition of:

$|Vij|<Vox\_thr, i=1$ and $j=2,3,4$ (4)

where $Vij=Vi-Vj$, $Vi=Vi(F1,F2,F3,F4)$, (5)

$Vj=Vj(F1,F2,F3,F4)$ (6)

For clarity, the number 1, 2, 3, and 4 above could be replaced with g (gate), s (source), d (drain), and nw (NW). Thus, the charging-free for a CMOS P-MOSFET can be expressed as $|Vij|<Vox\_thr, i=g$ and $j=s,d,nw$ (7)

where $Vij=Vi-Vj$, $Vi=Vi(Fg,Fs,Fd,Fnw)$, (8)

$Vj=Vj(Fg,Fs,Fd,Fnw)$ (9)

For the CMOS N-MOSFETS having three terminals without NW, the similar expressions as above may still be used.

Note that Vi or Vj in above could denote the potential at the terminal i or the terminal j relative to the wafer substrate. They can be equally viewed as the potential drop between the terminal i and the substrate or between the terminal j and the substrate.

The charging-free design for any given CMOS technology and process can be obtained by solving equations (7) to (9). A computer is essential for this extraction effort due to complexity of the mathematical formulations involved.

Figure 2C:
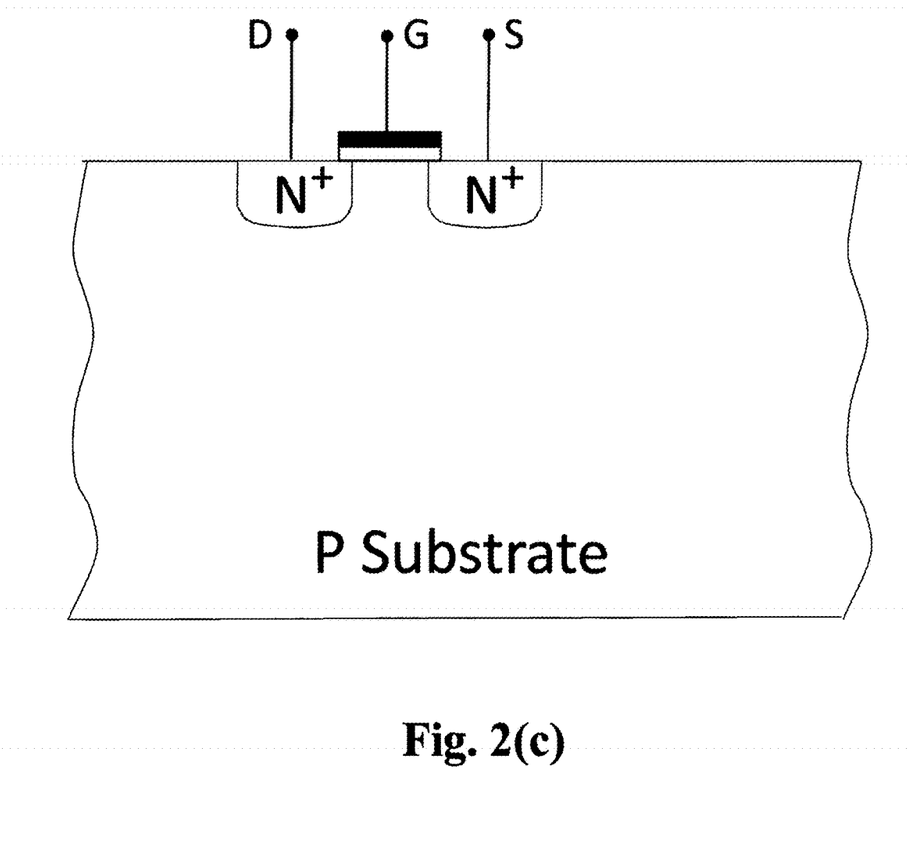
FIG. 2(c) shows a cross-sectional view of the 3-terminal N-MOSFET transistor, reduced from that of the generalized I-terminal insulator-gate field effect transistor shown in FIG. 2(a), according to one embodiment of the present disclosure.

FIG. 2(c) shows a cross-sectional view of the 3-terminal N-MOSFET transistor, reduced from that of the generalized I-terminal insulator-gate field effect transistor shown in FIG. 2(a), according to one embodiment of the present disclosure.

Figure 3:
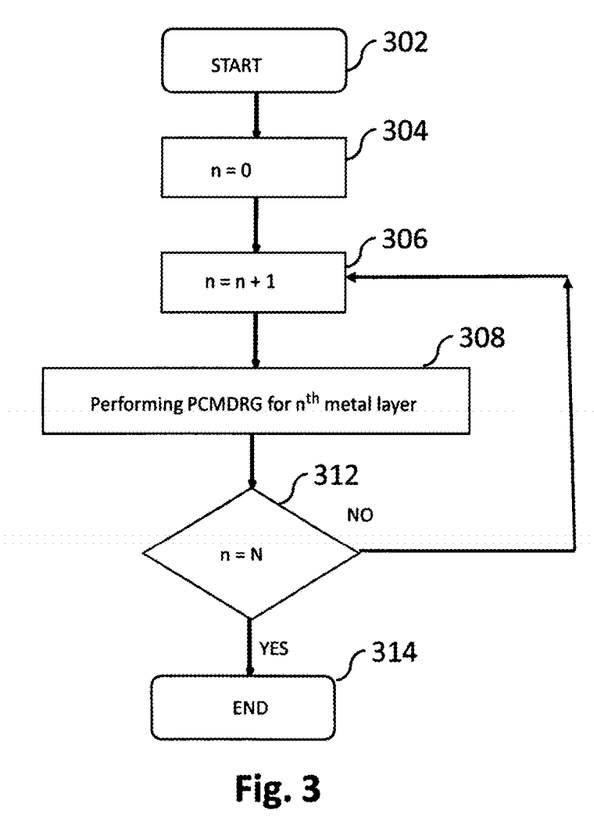
FIG. 3 is a flow chart of a process of the disclosed PCMDRG generating a complete set of the charging design rules for N-metal-layer technology according to one embodiment of the present disclosure.

FIG. 3 is a flow chart of a process 300 of the disclosed PCMDRG generating a complete set of the charging design rules for N-metal-layer technology according to one embodiment of the present disclosure. Four charging-free design rules are generated for each of the metal layers. They are labeled as the design rules of "+" plasma charging with non-protected gate, "−" plasma charging with non-protected gate, "+" plasma charging with protected gate, and "−" plasma charging with protected gate.

In step 302-306, the process 300 may start and get ready to perform the generation of the design rule for the metal layer. In step 308, the design rule generation may be performed for each metal layer and more details of step 308 would be described in FIG. 4. Since each of the metal layers may require its corresponding metal design rule, the process 300 may determine whether the design rule generation for all metal layers has been performed in step 312. If so, the process 300 may come to its end (step 314). Otherwise, the process 300 may return to step 306 before repeating step 308.

For a CMOS process with eight metal layers under the "+" and "−" plasma charging, the PCMDRG may generate a total of 16 non-protection and 16 protection metal design rules. The entire rule generation process basically may iterate an operation flow described in FIG. 4 for each of the metal layers. Iteration at each metal layer may consider the different height of that metal layer relative to the wafer substrate (i.e., thickness of all ILD layers beneath the "in-processing" metal layer).

Figure 4:
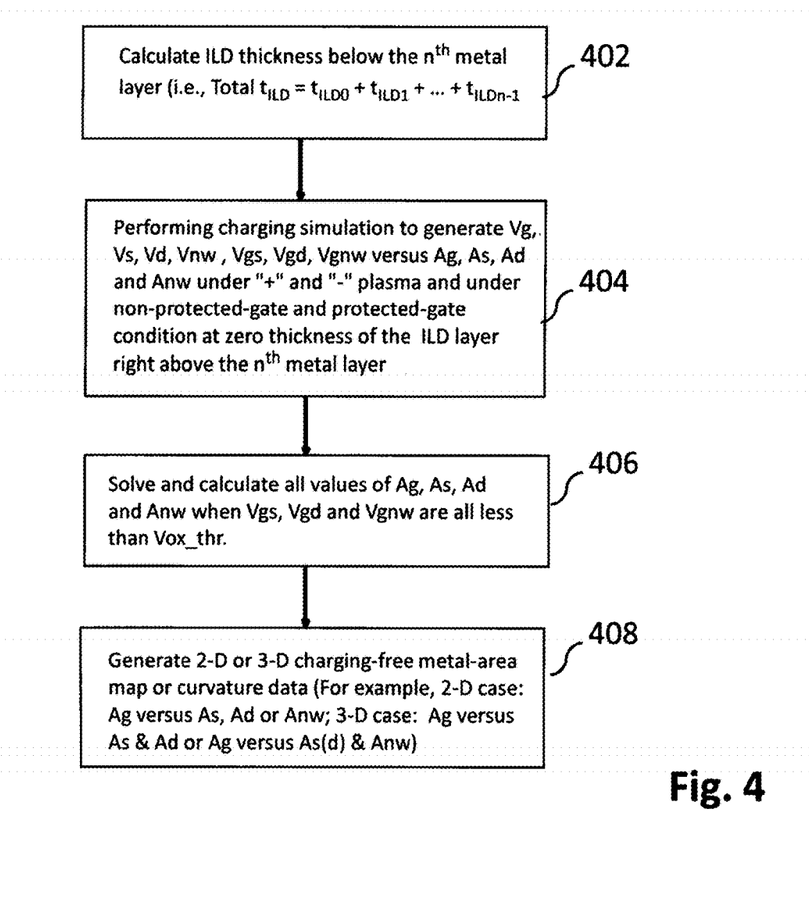
FIG. 4 shows a flow chart of a process of generating metal charging design rules for the Nth metal layer according to one embodiment of the present disclosure.

FIG. 4 shows a flow chart of a process 400 of generating the metal charging design rules for the Nth metal layer according to one embodiment of the present disclosure. The process of generating the design rules may start with calculating the thickness of ILD layer(s) beneath the metal layer for which the corresponding design rule is to be generated (step 402).

The process 400 may then perform the charging simulation to generate Vg, Vs, Vd, Vnw, Vgs, Vgd, and Vgnw versus Ag, As, Ad, and Anw under the "+" and "−" plasma charging events and under the non-protected-gate and protected-gate conditions at zero thickness of the ILD layer right above the metal layer for which the design rule is to be generated. Please note that this example is for the generation of the design rule for the P-MOSFET since parameters associated with the transistor NW terminal are calculated (step 404).

In step 406, the process 400 may derive Ag, As, Ad, and Anw when Vgs, Vgd, and Vgnw are below the gate oxide degradation threshold. In step 408, the process may generate the 2-D or 3-D charging-free metal area or curvature plot. In one implementation, the 2-D plot may show Ag versus As, Ad or Anw while the 3-D plot may show Ag versus both As and Ad or Ag versus As or Ad and Anw.

Results of the performance of the disclosed transistor PCMDRG for one CMOS case are demonstrated in the following.

P-MOSFETS of a ten-metal-layer CMOS process technology are used in demonstration, though it is worth noting the disclosed PCMDRG could be generating the charging-free/minimized design rules for other MOSFETS. Gate oxide thickness of the transistor in the example P-MOSFET is 35 Å. Charging degradation threshold for gate oxide of the example P-MOSFET is set at 2.5V. Range of a metal area of the example P-MOSFET in this simulation demonstration may be adjustable by users. A default range of the metal area is from 1 to 30,000 μm2.

Display on Computer Screen During Execution of the Disclosed Invention

The information displayed on computer screen during the performance of the disclosed PCMDRG for the P-MOSFETS under the "+" plasma and protected-gate condition according to one embodiment of the present disclosure is shown as follows:

Call PdrgPos( )
PdrgPos( ) Done !!!
Metal_1 PdrgPos( ): P+N Diode Protdection: Safe for S/D Antenna area up to 30,000 um2 !!!
Call PdrgPos( )
PdrgPos( ) Done !!!
Metal_2 PdrgPos( ): P+N Diode Protdection: Safe for S/D Antenna area up to 30,000 um2 !!!
Call PdrgPos( )
PdrgPos( ) Done !!!
Metal_3 PdrgPos( ): P+N Diode Protdection: Safe for S/D Antenna area up to 30,000 um2 !!!
Call PdrgPos( )
PdrgPos( ) Done !!!
Metal_4 PdrgPos( ): P+N Diode Protdection: : Failed for Larger S/D Antenna !!!
Call PdrgPos( )
PdrgPos( ) Done !!!
Metal_5 PdrgPos( ): P+N Diode Protdection: : Failed for Larger S/D Antenna !!!
Call PdrgPos( )
PdrgPos( ) Done !!!
Metal_6 PdrgPos( ): P+N Diode Protdection: : Failed for Larger S/D Antenna !!!
Call PdrgPos( )
PdrgPos( ) Done !!!
Metal_7 PdrgPos( ): P+N Diode Protdection: : Failed for Larger S/D Antenna !!!
Call PdrgPos( )
PdrgPos( ) Done !!!

-continued

```
Metal_8 PdrgPos( ): P+N Diode Protdection: : Failed for Larger S/D
Antenna !!!
Call PdrgPos( )
PdrgPos( ) Done !!!
Metal_9 PdrgPos( ): P+N Diode Protdection: : Failed for Larger S/D
Antenna !!!
Call PdrgPos( )
PdrgPos( ) Done !!!
Metal_10 PdrgPos( ): P+N Diode Protdection: : Failed for Larger S/D
Antenna !!!
```

It shows that for preventing the transistor gate oxide from being damaged because of the plasma-involved ILD process on the metal layers from metal-1 to metal-10, no design limit for the metal area of the metal connected at the transistor source and drain terminals from metal-1 to metal-3 layers may be required. At the metal layers from the metal-4 and above, larger area of the metals connected at the transistor source and drain terminals may likely cause the charging damage to the transistor gate oxide.

The information displayed may be preliminary one. The details of the maximum allowed metal area at each metal layer for the transistor could be given in output files. The content of extracted protected charging design rules under the conditions of the "+" and "−" plasma and the resulting final protected charging design rules according to one embodiment of the present disclosure is shown in the following. Three corresponding output files could be Protected_Pchg+_drg.dat, Protected_Pchg-_drg.dat, and Protected_Pchg_drg.dat, respectively. The constraint for the source and drain metal area may become necessary at the metal-4 layer and beyond (i.e., in ILD-4 and other higher-layer ILD process). The charging design rules under the "+" and "−" plasma conditions may be similar. The intersection of the "+" and "−" plasma gate-protected charging design rule gives rise to the final Gate-Protected design rule which basically may be dominated by the "−" plasma gate-protected charging design rule.

Output file: Protected_Pchg+_drg.dat
Pmos "+" Charging Gate_Protected
Tox = 35 A Vox_thr = 2.5 V

| Metal_Layer | As_d_max |
|---|---|
| 1 | 30000 |
| 2 | 30000 |
| 3 | 30000 |
| 4 | 20100 |
| 5 | 3800 |
| 6 | 2500 |
| 7 | 2000 |
| 8 | 1800 |
| 9 | 1600 |
| 10 | 1500 |

Output file: Protected_Pchg-_drg.dat
Pmos "−" Charging Gate_Protected
Tox = 35 A Vox_thr = 2.5 V

| Metal_Layer | As_d_max |
|---|---|
| 1 | 30000 |
| 2 | 30000 |
| 3 | 30000 |
| 4 | 18700 |
| 5 | 3800 |
| 6 | 2500 |
| 7 | 2000 |
| 8 | 1700 |
| 9 | 1600 |
| 10 | 1500 |

Output file: Protected_Pchg_drg.dat
Pmos Gate_Protected Design Rule
Tox = 35 A Vox_thr = 2.5 V

| Metal_Layer | As_d_max |
|---|---|
| 1 | 30000 |
| 2 | 30000 |
| 3 | 30000 |
| 4 | 18700 |
| 5 | 3800 |
| 6 | 2500 |
| 7 | 2000 |
| 8 | 1700 |
| 9 | 1600 |
| 10 | 1500 |

The disclosed transistor PCMDRG may also generate the output files which provide in detail the extracted terminal potentials and between-terminal potential drops versus gate or source_drain metal area ranging from 100 to 30,000ρ m2. For one particular metal layer, four such files may be generated under the conditions of the "+" and "−" plasma and non-protected gate and protected-gate. For example, for the metal-1 layer, these 4 output files are: M1_playback_Pdrg_0_Ag.dat, M1_playback_Pdrg-_0_Ag.dat, M1_playback_Pdrg+_1_Asd.dat, and M1_playback_Pdrg-_1_Asd.dat.

If there are 10 metal layers in the manufacturing process, then 40 (=4×10) detailed output files may be generated with the file names as M[n]_playback_[DeviceType]drg[PlasmaType]_[ProtectionCode]_A[DeviceTerminal].dat, where [n] represents the nth metal layer, [DeviceType] can be either P or N, [PlasmaType] can be either + or −, [ProtectionCode] is either 0 referring to no gate protection, or 1 referring to gate protection, A[DeviceTerminal] will be Ag indicative of the metal area at the transistor gate if [ProtectionCode] is 0, or Asd indicative of the metal area at the transistor source and drain, if [ProtectionCode] is 1.

These detailed output files may be the source where the design rules at each metal layer may be derived. One can examine these files to find out why a limit is imposed on the metal area of the metal connected at the transistor source and drain terminal during the "+" plasma protected-gate condition beginning from the metal-4 layer, as indicated in the above. Such limit may be shown in the content of the output file M4_playback_Pdrg+_1_Asd below:

| N_iter | As_d | Vgs | Vgd | Vgnw | Vg | Vs_d | Vnw |
|---|---|---|---|---|---|---|---|
| 27 | 100 | −1.92711 | −1.92711 | −2.62283 | 0.212482 | 2.13959 | 2.83531 |
| 4 | 200 | −2.03041 | −2.03041 | −2.61644 | 0.218874 | 2.24929 | 2.83531 |
| 4 | 300 | −2.08817 | −2.08817 | −2.61203 | 0.223285 | 2.31146 | 2.83531 |
| 4 | 400 | −2.12778 | −2.12778 | −2.60866 | 0.226655 | 2.35444 | 2.83531 |
| 4 | 500 | −2.15767 | −2.15767 | −2.60593 | 0.229379 | 2.38704 | 2.83531 |
| 3 | 600 | −2.1815 | −2.1815 | −2.60365 | 0.231658 | 2.41315 | 2.83531 |
| 3 | 700 | −2.20121 | −2.20121 | −2.6017 | 0.233614 | 2.43483 | 2.83531 |
| . | | | | | | | |
| . | | | | | | | |
| . | | | | | | | |
| 2 | 19400 | −2.49828 | −2.49828 | −2.56622 | 0.269242 | 2.76752 | 2.83547 |
| 2 | 19500 | −2.49852 | −2.49852 | −2.56619 | 0.269274 | 2.76779 | 2.83547 |
| 2 | 19600 | −2.49875 | −2.49875 | −2.56616 | 0.269306 | 2.76806 | 2.83547 |
| 2 | 19700 | −2.49898 | −2.49898 | −2.56613 | 0.269337 | 2.76832 | 2.83547 |
| 2 | 19800 | −2.49922 | −2.49922 | −2.5661 | 0.269369 | 2.76858 | 2.83547 |
| 2 | 19900 | −2.49945 | −2.49945 | −2.56607 | 0.2694 | 2.76884 | 2.83547 |
| 2 | 20000 | −2.49967 | −2.49967 | −2.56604 | 0.26943 | 2.7691 | 2.83547 |
| 2 | 20100 | −2.4999 | −2.4999 | −2.56602 | 0.269461 | 2.76936 | 2.83548 |
| 2 | 20200 | −2.50012 | −2.50012 | −2.56599 | 0.269491 | 2.76961 | 2.83548 |
| 2 | 20300 | −2.50034 | −2.50034 | −2.56596 | 0.269521 | 2.76987 | 2.83548 |
| 2 | 20400 | −2.50056 | −2.50056 | −2.56593 | 0.269551 | 2.77012 | 2.83548 |
| . | | | | | | | |
| . | | | | | | | |
| . | | | | | | | |
| 2 | 29000 | −2.51477 | −2.51477 | −2.56414 | 0.271483 | 2.78625 | 2.83562 |
| 2 | 29100 | −2.51489 | −2.51489 | −2.56412 | 0.2715 | 2.78639 | 2.83562 |
| 2 | 29200 | −2.51502 | −2.51502 | −2.56411 | 0.271516 | 2.78653 | 2.83563 |
| 2 | 29300 | −2.51514 | −2.51514 | −2.56409 | 0.271533 | 2.78667 | 2.83563 |
| 2 | 29400 | −2.51526 | −2.51526 | −2.56408 | 0.27155 | 2.78681 | 2.83563 |
| 2 | 29500 | −2.51538 | −2.51538 | −2.56406 | 0.271566 | 2.78695 | 2.83563 |
| 2 | 29600 | −2.5155 | −2.5155 | −2.56405 | 0.271583 | 2.78709 | 2.83563 |
| 2 | 29700 | −2.51562 | −2.51562 | −2.56403 | 0.271599 | 2.78722 | 2.83563 |
| 2 | 29800 | −2.51574 | −2.51574 | −2.56402 | 0.271616 | 2.78736 | 2.83564 |
| 2 | 29900 | −2.51586 | −2.51586 | −2.56401 | 0.271632 | 2.78749 | 2.83564 |
| 2 | 30000 | −2.51598 | −2.51598 | −2.56399 | 0.271648 | 2.78763 | 2.83564 |

One can clearly see when A_sd exceeds 20,100μ m2 |Vgs| and |Vgd| may become larger than the damage (gate oxide degradation) threshold, Vox_thr, which may be set at 2.5V. Note that when A_sd varies from 100 to 30000μ m2 |Vgnw| is greater than Vox_thr, or 2.5V. However, because the transistor is driven into its strong inversion condition (i.e., Vgs=−1.9V to −2.51V<<Vt), there is a depletion region underneath the transistor channel region. This depletion region will take quite a bit of potential drop off Vgnw, leading to |Vgc|, or the potential drop between transistor gate and transistor channel, to be less than 2.5V. As a result, one would not take into account Vgnw that is greater than Vox_thr in value when extracting the design rule for minimizing or even eliminating the potential plasma-based charging damage.

Figure 5A:
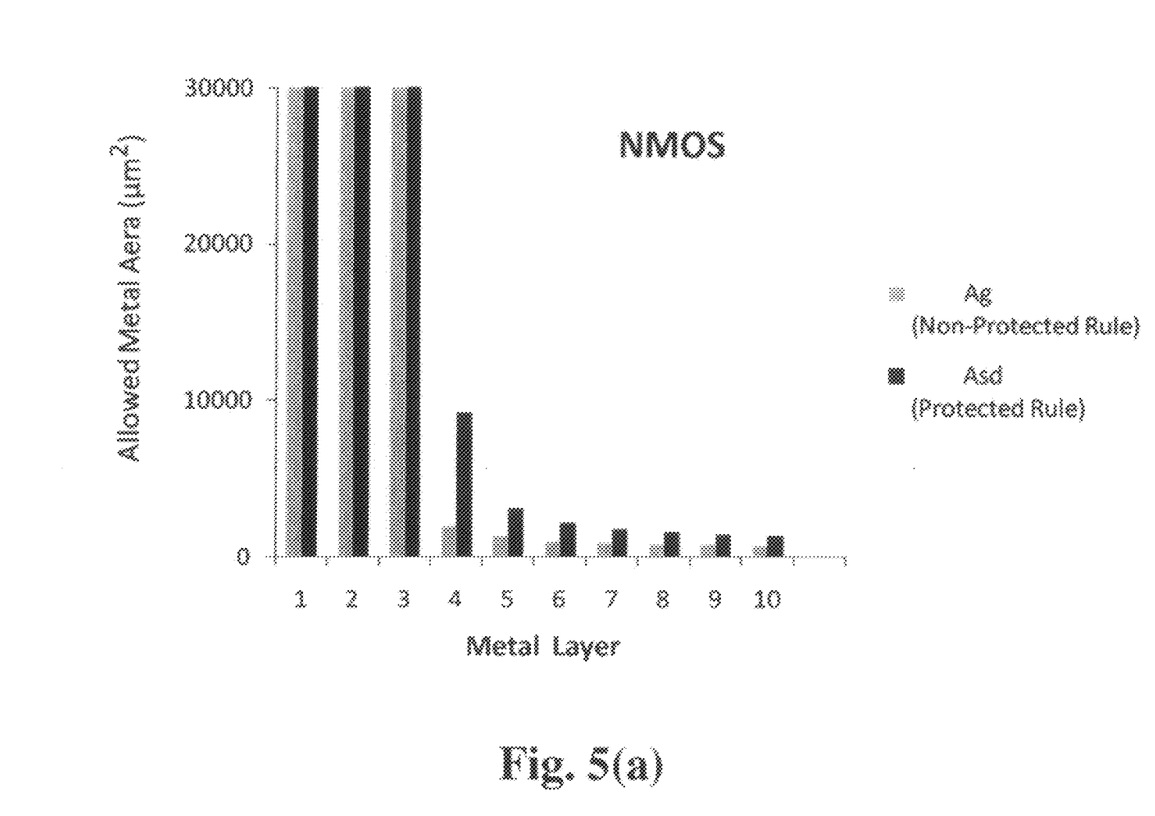
FIG. 5(a) shows the maximum allowed metal area at the transistor terminals versus the metal layer for a NMOS transistor undergoing a 10-metal-layer CMOS chip manufacturing process without being subject to the plasma charging damage according to one embodiment of the present disclosure.

FIG. 5(a) shows the metal area allowed at the transistor gate, source and drain terminals versus the metal layer for a NMOS transistor undergoing a 10-metal-layer CMOS chip manufacturing process without being subject to the plasma charging damage according to one embodiment of the present disclosure. The metal area at the transistor gate terminal allowed without subjecting the transistor to the plasma charging damage may be based on the non-protected metal design rules extracted by the disclosed transistor PCMDRG. The metal area at the transistor source and drain terminals allowed without subjecting the transistor to the plasma charging damage may be based on the extracted protected metal design rules. The allowed Ag in the NMOS metal design rule in the non-protection case has no constraint only at the lowest three metal layers. The maximum allowed metal area may decrease dramatically from the metal-3 to metal-5 layers and such trend may continue as the manufacturing moves to the higher metal layers. The trend of the allowed Asd in the protection case is similar to Ag in the non-protection case and slightly more stringent.

Figure 5B:
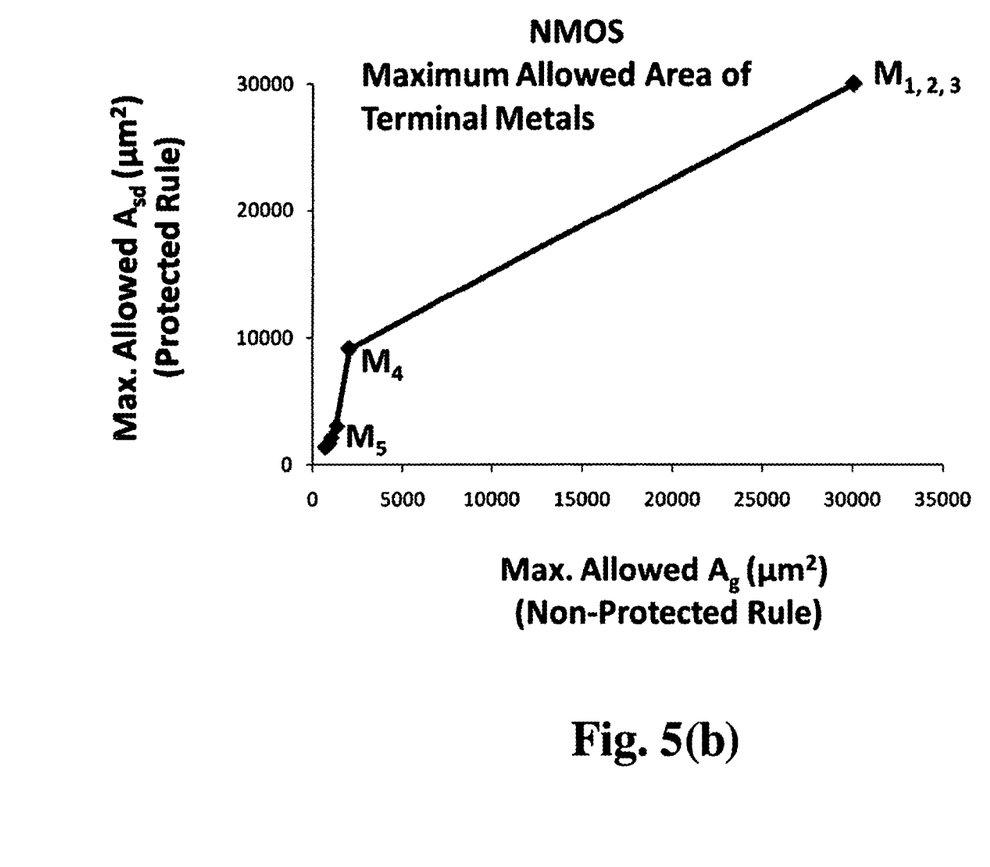
FIG. 5(b) shows correlation between the maximum allowed Asd and Ag at different metal layers in FIG. 5(a) according to one embodiment of the present disclosure.
Figure 5C:
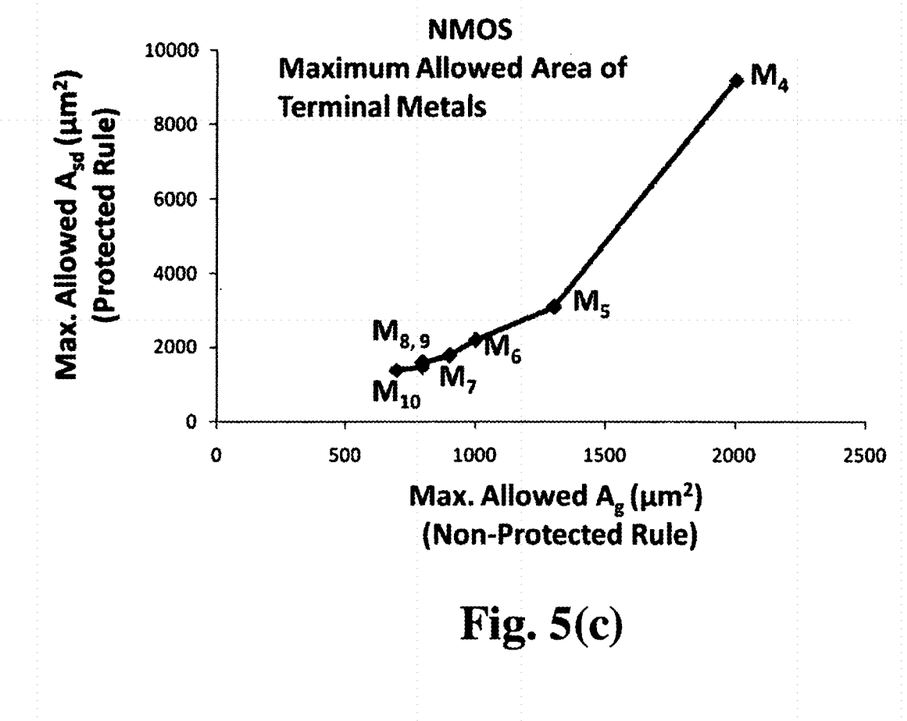
FIG. 5(c) shows the magnified portion of the lower corner in FIG. 5(b) according to one embodiment of the present disclosure.

FIG. 5(b) is another way of representing the generated design rules according to one embodiment of the present disclosure. FIG. 5(b) effectively shows the correlation between the maximum allowed Asd and Ag at different metal layers in FIG. 5(a) according to one embodiment of the present disclosure. Maximum allowed Asd and Ag at different metal layers are correlated each other in a plot. Such presentation makes one readily comprehend not only the scope and the metal-layer dependence of the extracted protected and non-protected design rules for the metal areas but also the relationship between the protected and non-protected design rules. FIG. 5(c) is the magnified portion of the lower corner in FIG. 5(b).

Note that the results shown in above are just under one particular condition of the transistor design and chip manufacturing process. Any change or adjustment to parameters in the condition would lead to a new set of metal design rules. The present disclosure not only can be useful during the transistor and process technology development or circuit design, but also used in exploring new ideas, new technologies or new designs even long before the transistor and process technology development or the circuit design process begins. Engineers dealing with the transistors, manufacturing process, manufacturing equipments or quality and assurance can all benefit from the use of any tool developed based on the present disclosure, not to mention circuit designers who critically rely on the design rules in their design.

The present disclosure can be used in conjunction with the currently existing industrial methodology but with far fewer test structures (only the most basic ones from previous generation process technology) for calibration purpose.

Such combined methodology would also be more time-saving and cost-efficient if the users adopting the present disclosure would prefer taking a more conservative approach in migrating to the new physics-driven and model-based methodology before the existing methodology is phased out.

The present disclosure may, be practiced as a software invention, implemented in the form of a machine-readable medium having stored thereon at least one sequence of instructions that, when executed, causes a machine to effect the present disclosure. With respect to the term "machine," such term should be construed broadly as encompassing all types of machines, e.g., a non-exhaustive listing including: computing machines, non-computing machines, communication machines, etc. Similarly, with respect to the term "machine-readable," such term should be construed broadly as encompassing a broad spectrum of mediums, e.g., a non-exhaustive listing including: magnetic medium (floppy disks, hard disks, magnetic tapes, etc.), optical medium (CD-ROMs, DVD-ROMs, etc.), flash-based medium (EPROM Flash memories, EPROM Flash hard disks, etc.), etc.

Some modifications of these examples, as well as other possibility will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A computer-implemented method capable of preparing a design rule indicative of a terminal metal area size of a transistor, minimizing a plasma-induced charging effect to the transistor in a plasma-based process for a dielectric layer performed on a metal layer above the transistor, comprising:
   a non-transitory computer readable medium comprising
      a set of computer instructions when executed by a computer system causing the system to execute a design-for-manufacturing process;
   a design rule generator engine, possessing a capability of accurately and swiftly simulating, evaluating and delivering design solutions for interconnect metals and dielectrics while largely saving test chip layout space, further comprising
      receiving an input of a transistor characteristics, a plasma characteristics, and an interconnect characteristics;
      calculating a potential at a first terminal on a first side of the transistor and potentials at a set of terminals at a second side of the transistor using a plasma-charging-effect function associated with the first terminal, and plasma-charging-effect functions associated with the set of the terminals at the second side of the transistor;
      determining a difference in potential between the first terminal at the first side of the transistor and the terminals at the second side of the transistor and whether the difference in potential between the first terminal at the first side of the transistor and the terminals at the second side of the transistor exceeds a degradation threshold;
      determining a metal area size for the first terminal corresponding to the difference in potential between the first terminal at the first side of the transistor and the terminals at the second side of the transistor being less than the degradation threshold;
   performing the design-for-manufacturing process based on minimized plasma-induced charging effect to the transistor of the integrated circuit; and
   manufacturing the integrated circuit.

2. The computer-implemented method according to claim 1, wherein the plasma-charging-effect function associated with the first terminal at the first side of the transistor and the plasma-charging-effect functions associated with the terminals at the second side of the transistor take into consideration internal and external structure of the transistor, conditions and recipes of manufacturing process of the transistor, and surroundings of the transistor.

3. The computer-implemented method according to claim 1, wherein the design rule generator engine further comprising determining a metal area size for each of the terminals at the second side of the transistor corresponding to the difference in potential between each of the terminals and the first terminal being less than the degradation threshold.

4. The computer-implemented method according to claim 1, wherein the first terminal is a gate terminal of the transistor and the number of the terminals at the second side of the transistor depends on the type of the transistor.

5. The computer-implemented method according to claim 1, wherein the difference in potential between the first terminal at the first side of the transistor and the terminals at the second side of the transistor refers to a potential difference across a gate oxide of the transistor.

6. The computer-implemented method according to claim 1, wherein the design rule generator engine further comprising calculating thickness of the dielectric layer below the metal layer.

7. The computer-implemented method according to claim 1, wherein the transistor characteristics include a transistor type, a transistor internal and external physical features, a transistor leakage related parameters associated with its internal features, a transistor external connectivity and associated parameters, a transistor gate oxide thickness, a transistor leakage behavior, a transistor gate oxide degradation threshold, and an option for connecting a protection device at the transistor gate.

8. The computer-implemented method according to claim 1, wherein the plasma characteristics include a polarity of a plasma source, a plasma loading characteristics as a function of the plasma power, plasma illumination intensity and associated parameters.

9. The computer-implemented method according to claim 1, wherein the interconnect characteristics include a number of interconnect metal layers, a thickness and property of each of the inter-metal-layer dielectrics layers, and associated parameters of interconnect metals and dielectrics.

10. A computer system capable of preparing a design rule indicative of a terminal metal area size for a transistor, minimizing a plasma-induced charging effect to the transistor in a plasma-based process for a dielectric layer performed on a metal layer above the transistor, comprising a transistor plasma charging metal design rule generator, wherein the transistor plasma charging metal design rule generator is configured to include:
   a non-transitory computer readable medium comprising
      a set of computer instructions when executed by a computer system causing the system to execute the design rule generation tasks;

a design rule generator engine, possessing a capability of accurately and swiftly simulating, evaluating and delivering design solutions for interconnect metals and dielectrics while largely saving test chip layout space, further comprising receiving an input of a transistor characteristics, a plasma characteristics, and an interconnect characteristics;

calculating a potential at a first terminal at a first side of the transistor and potentials at a set of terminals at a second side of the transistor using a plasma-charging-effect function associated with the first terminal, and plasma-charging-effect functions associated with the terminals at the second side of the transistor;

determining a difference in potential between the first terminal at the first side of the transistor and each of the terminals at the second side of the transistor and whether the difference in potential between the first terminal at the first side of the transistor and each of the terminals at the second side of the transistor exceeds a degradation threshold;

determining a metal area size for the first terminal corresponding to the difference in potential between the first terminal at the first side of the transistor and each of the terminals at the second side of the transistor being less than the degradation threshold;

performing the design-for-manufacturing process based on minimized plasma-induced charging effect to the transistor of the integrated circuit; and manufacturing the integrated circuit.

11. The computer system according to claim 10, wherein the plasma-charging-effect function associated with the first terminal at the first side of the transistor and the plasma-charging-effect functions associated with the terminals at the second side of the transistor take into consideration internal and external structure of the transistor, conditions and recipes of manufacturing process of the transistor, and surroundings of the transistor.

12. The computer system according to claim 10, wherein the design rule generator engine is further configured to determine a metal area size for each of the terminals at the second side of the transistor corresponding to the difference in potential between each of the terminals and the first terminal being less than the degradation threshold.

13. The computer system according to claim 10, wherein the first terminal is a gate terminal of the transistor and the number of the terminals at the second side of the transistor depends on the type of the transistor.

14. The computer system according to claim 10, wherein the difference in potential between the first terminal at the first side of the transistor and the terminals at the second side of the transistor refers to a potential difference across a gate oxide of the transistor.

15. The computer system according to claim 10, wherein the design rule generator engine is further configured to calculate a thickness of the dielectric layer below the metal layer.

16. The computer system according to claim 10, wherein the transistor characteristics include a transistor type, a transistor internal and external physical features, a transistor leakage related parameters associated with its internal features, a transistor external connectivity and associated parameters, a transistor gate oxide thickness, a transistor leakage behavior, a transistor gate oxide degradation threshold, and an option for connecting a protection device at the transistor gate.

17. The computer system according to claim 10, wherein the plasma characteristics include a polarity of a plasma source, a plasma loading characteristics as a function of the plasma power, plasma illumination intensity and associated parameters.

18. The computer system according to claim 10, wherein the interconnect characteristics include a number of interconnect metal layers, a thickness and property of each of the inter-metal-layer dielectrics, and associated parameters of interconnect metals and dielectrics.

* * * * *